United States Patent [19]

Patel

[11] 3,879,342

[45] Apr. 22, 1975

[54] PRE-RECORDED DIGITAL DATA COMPENSATION SYSTEM

[75] Inventor: Ramesh S. Patel, Dallas, Tex.

[73] Assignee: Honeywell Information Systems, Inc., Waltham, Mass.

[22] Filed: Dec. 28, 1973

[21] Appl. No.: 429,450

[52] U.S. Cl. .......... 360/45
[51] Int. Cl. .......... G11b 5/09
[58] Field of Search .......... 360/45

[56] References Cited

UNITED STATES PATENTS

| | | | |
|---|---|---|---|
| 3,067,422 | 12/1962 | Hunt | 360/45 |
| 3,159,840 | 12/1964 | Woo | 360/45 |
| 3,345,638 | 10/1967 | Christol | 360/45 |
| 3,377,583 | 4/1968 | Sims | 360/45 |
| 3,488,662 | 1/1970 | Vallee | 360/45 |

*Primary Examiner*—Vincent P. Canney
*Attorney, Agent, or Firm*—William F. White; Ronald T. Reiling

[57] ABSTRACT

A data compensation system as provided within a digital data magnetic recording system. The data compensation system detects and corrects for certain patterns of digitally encoded pulses which would otherwise result in undesirable pulse shifting when these patterns are recorded and subsequently retrieved.

In a preferred embodiment, the data compensation detects and compensates for pulse shifting occurring in two specific patterns of encoded pulses. One pattern of encoded pulses requires that a particular pulse within the pattern be advanced whereas the other pattern requires that a particular pulse within the pattern be delayed. The specific patterns of encoded pulses occur in three-frequency encoded data.

17 Claims, 8 Drawing Figures

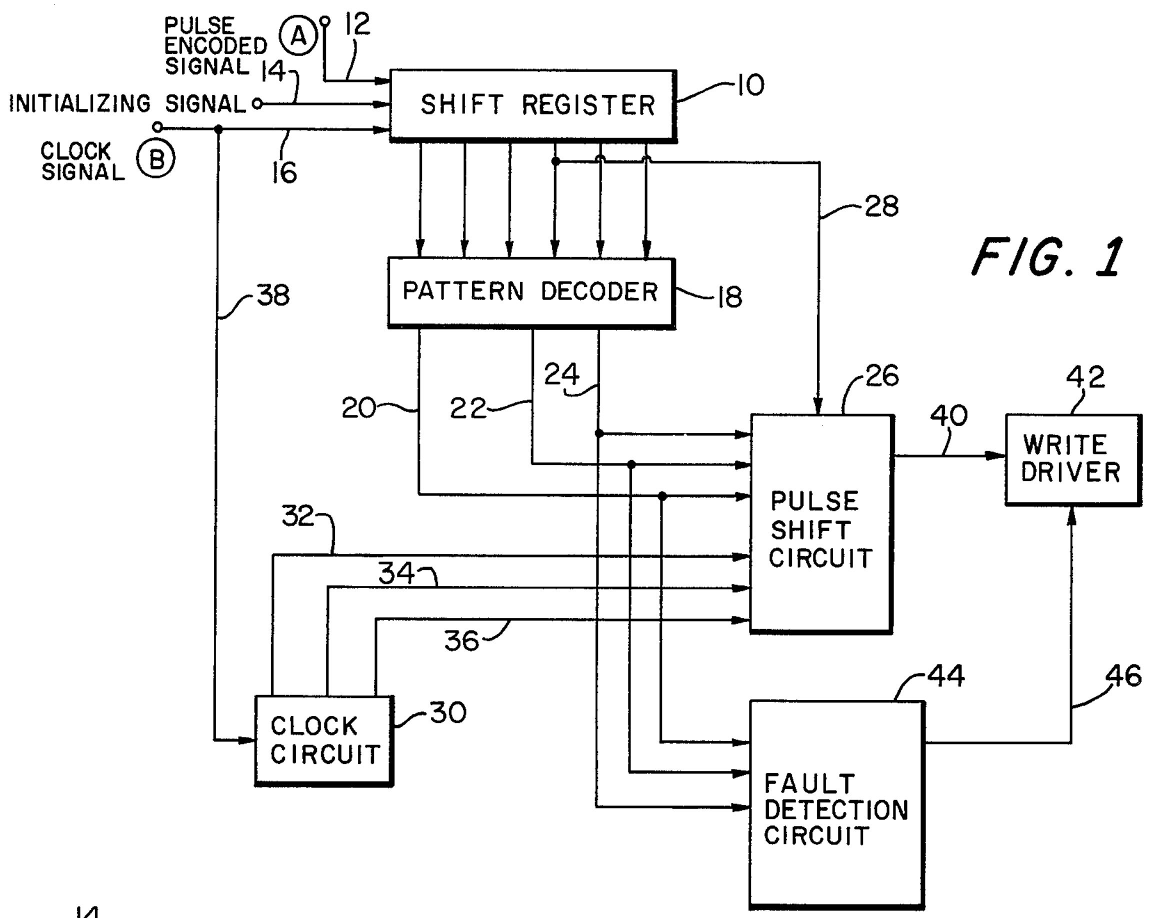
FIG. 1
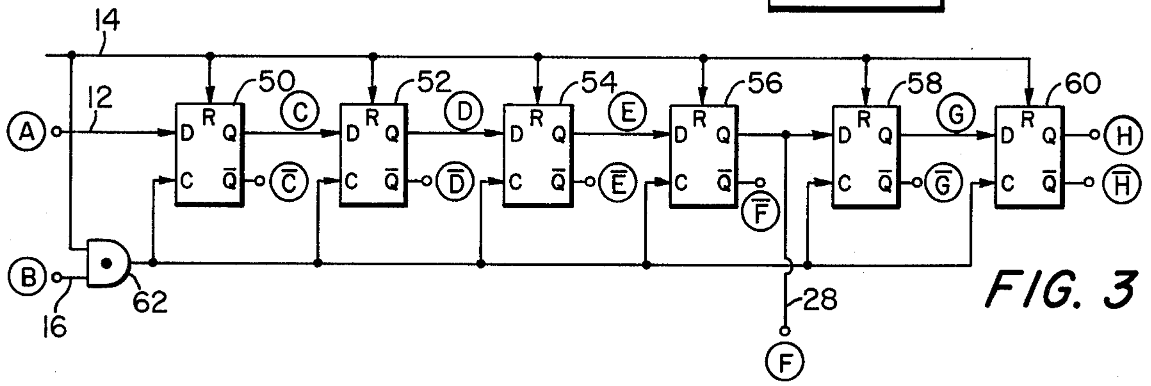
FIG. 3
DECISION TABLE
| | INPUT SIGNALS | C | D | E | F | G | H |
|---|---|---|---|---|---|---|---|
| OUTPUT SIGNALS | ADVANCE | 1/0 | 0 | 0 | 1 | 0 | 1 |
| | DELAY | 0 | 1 | 0 | 1 | 0 | 0 |
| | NO SHIFT | ALL OTHER PATTERNS | | | | | |
FIG. 4

PRE-RECORDED DIGITAL DATA COMPENSATION SYSTEM

FIELD OF INVENTION

This invention relates to the recording of digital data on a magnetic medium. In particular, this invention relates to both the detection and the correction of certain shifting which occurs in magnetically recorded digital data.

BACKGROUND OF THE INVENTION

A digital data recording system in general begins with an encoding of binary information in a prescribed manner according to a particular digital code. The resultingly encoded information is usually in the form of a pulse encoded signal which is applied to a magnetic recording head. The magnetic recording head records the pulses on a magnetic medium for later retrieval by a digital data recovery system. Theoretically, the recorded pulses should be retrievable through the data recovery system in the exact encoded form in which they appeared prior to being recorded. However, due to the magnetic properties of the recording medium, the particular characteristics of the transducers used to record and retrieve the information, and the particular pattern of pulses being recorded, the retrieved pulses often do not appear in the exact encoded form which they were in prior to being recorded. Instead, certain patterns of encoded pulses contain significant pulse shifts when retrieved from the magnetic medium.

One particular digital code which results in a number of different pulse patterns is that of "three frequency" or "modified frequency modulation" digital coding. Three frequency, as the name implies, can result in three different and distinct basic frequencies of encoded pulses. These three frequencies result in patterns of encoded pulses which produce predictable pulse shifts when the patterns are recorded and subsequently retrieved from the magnetic media.

OBJECTS OF THE INVENTION

It is therefore an object of this invention to provide a system which detects certain patterns of encoded digital information which will result in appreciable pulse shifting when the information is subsequently recovered.

It is a further object of this invention to provide a pre-recording data compensation system which introduces compensation for pulse shifting into a pattern of encoded pulses that would otherwise undergo appreciable pulse shifting during recording and subsequent recovery.

It is a still further object of this invention to provide a pre-recording data compensation system which detects and corrects for certain pulse shifting which would otherwise occur in the retrieval of three frequency encoded information.

SUMMARY OF THE INVENTION

The above objects are achieved according to the present invention by providing a data compensation system within an overall digital data recording system. The data compensation system receives digitally encoded pulses from a digital encoder and internally stores these pulses in a shift register. The contents of the shift register are applied to a pulse pattern decoder which detects when certain particular patterns of encoded pulses are present in the shift register. When one of these particular patterns is detected, the pattern decoder activates a pulse shift circuit which implements a particular pulse shift. The implemented pulse shift is such as to compensate for the pulse shifting which would otherwise occur when the pulse pattern is recorded and subsequently retrieved. The data compensation system also contains a fault detection circuit which detects erroneous internal signal conditions.

BRIEF DESCRIPTION OF THE DRAWINGS

For a better understanding of the present invention, reference should be made to the accompanying drawings wherein:

FIG. 1 illustrates the data compensation system of the present invention which comprises a shift register, a pattern decoder, a pulse shift circuit, a clock circuit, and a fault detection circuit.

FIGS. 3, 5, 6, 7 and 8 illustrate in detail the various elements of the data compensation system of FIG. 1.

FIG. 4 is a decision table for the pattern decoder of FIG. 1.

DESCRIPTION OF THE PREFERRED EMBODIMENT

Figure 2:
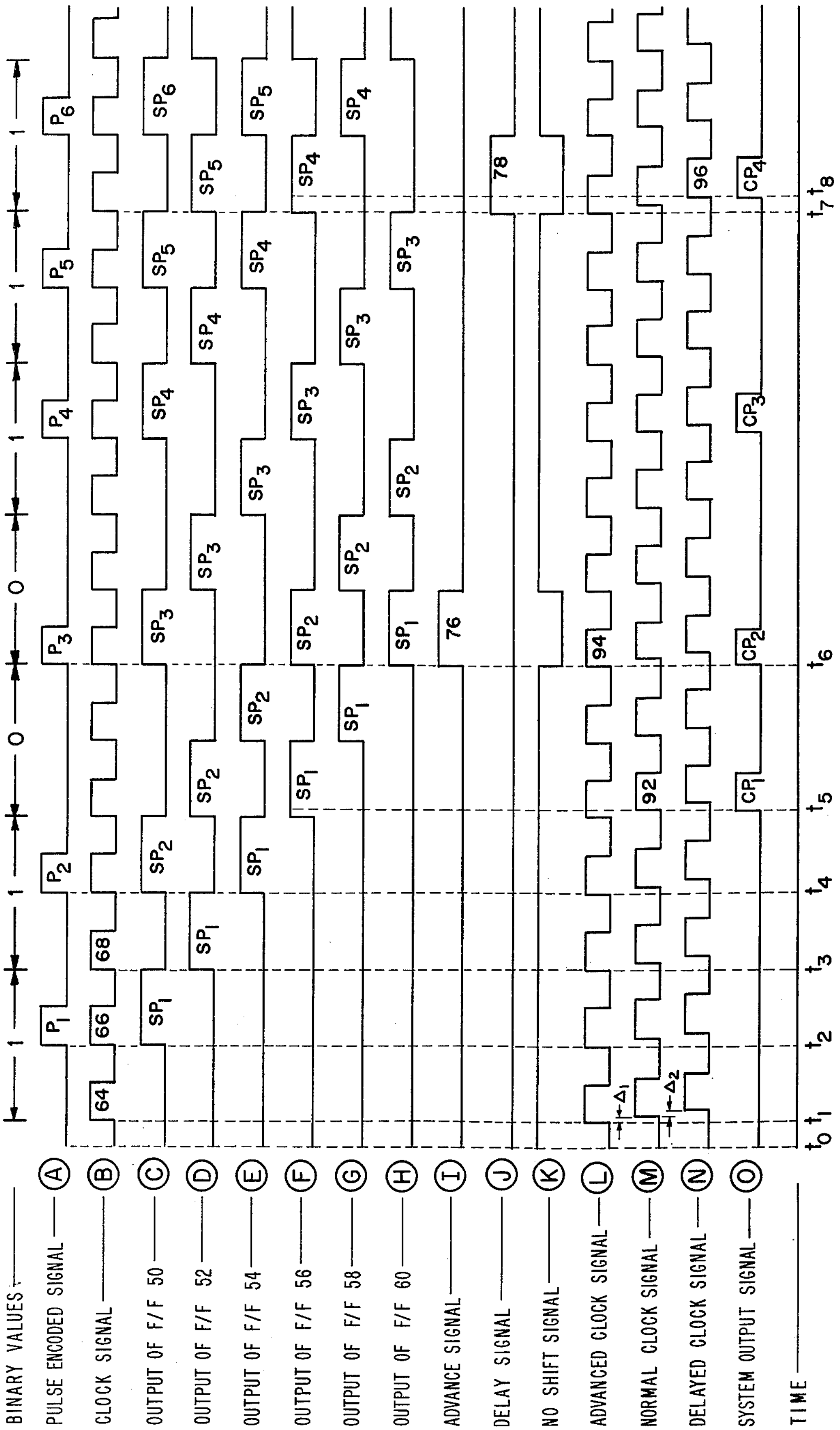
FIG. 2 is an illustration of various waveforms exemplifying a set of signal conditions occurring within the data compensation system of FIG. 1.

Referring to FIG. 1, a pulse encoded signal A from a digital data encoder (not shown) is applied to a shift register 10 over a line 12. The shift register 10 has previously been set to zero by a reset signal appearing on line 14. A clock signal B appearing on a line 16 is also applied to the shift register 10 so as to cause the shift register to incrementally shift each time a clock pulse occurs. As will be shown in detail hereinafter, a clock pulse will occur every one-half of a bit cell period of time so as to thereby incrementally shift the shift register 10 each one-half of a bit cell period. The shift register 10 stores the signal level of the pulse encoded signal A in one-half bit cell increments and subsequently shifts these stored signal levels in one-half bit cell increments. Since the pulse encoded signal contains various encoded pulses, these pulses will be stored in the shift register for subsequent shifting each time one occurs in a one-half bit cell increment being applied to the shift register.

The contents of the shift register 10 are continuously applied to a pattern decoder 18 which detects when certain patterns of stored pulses are present in the shift register 10. As will be explained in detail hereinafter, the pattern decoder identifies those patterns which will ultimately result in any appreciable pulse shifting. To this end, the pattern decoder 18 generates a signal on a line 20 when a pulse pattern is detected which would ultimately result in a premature pulse, and generates a signal on a line 22 when a pattern is detected which would ultimately result in a delayed pulse. When a pattern is detected which will not result in any appreciable pulse shifting, then the pattern decoder generates a signal on a line 24.

All three signals from the pattern decoder 18 are applied to a pulse shift circuit 26 over the lines 20–24. The pulse shift circuit also receives the stored pulse signal from the fourth cell of the shift register 10 over a line 28. As will be explained in detail hereinafter, the pulse shift circuit 26 is operative to either advance, delay, or normally gate the stored pulse signal present on the line 28. In so doing, any encoded pulse which might otherwise experience an undesirable shift during recording and subsequent recovery is now pre-shifted prior to recording to compensate for this undesirable shifting. The particular pulse shift which is of course implemented will depend on which of the particular signals is received from the pattern decoder 18. In order to either advance, delay or otherwise normally gate the stored pulse signal present on the line 28, the pulse shift circuit 26 also receives three separate clock signals from a clock circuit 30. These three clock signals comprise an advanced clock signal appearing on a line 32, a normal clock signal appearing on a line 34, and a delayed clock signal appearing on line 36. The clock circuit 30 generates these three separate clock signals by delaying the clock signal which is applied to the clock circuit 30 over a line 38. The time delay between the advanced clock signal and the normal clock signal is equal to the amount of pulse shifting desired when the stored pulse signal present on the line 28 is to be advanced by the pulse shift circuit 26. The time delay between the normal clock signal and the delayed clock signal is equal to the amount of pulseshifting desired when the stored pulse signal present on the line 28 is to be delayed by the pulse shift circuit 26. The pulse shift circuit 26 selectively gates the stored pulse signal present on the line 28 with one of the three clock signals to thereby either advance, delay or cause simultaneous occurence of the stored pulse with respect to the normal clock signal. The resulting pulse output from the pulse shift circuit 26 represents a compensated pulse encoded signal wherein certain of the pulses have been compensatingly shifted. This compensated pulse encoded signal is thereafter applied over a line 40 to write driver circuit 42 which records flux reversals on a magnetic media in response to the various occurring pulses.

A fault detection circuit 44 receives the three output signals from the pattern decoder 18 and detects if an erroneous signal condition has been generated by the pattern decoder. In the event that all signals from the pattern decoder 18 are low or more than one is high, the fault detection circuit 42 generates a fault signal on a line 46 which will deactivate the write driver circuit 42.

Referring to FIG. 2, a particular pulse encoded signal waveform A is applied to the shift register 10 over the line 12. The pulse encoded signal waveform A is encoded according to the three frequency digital code as is illustrated by the binary values appearing immediately above the pulses of waveform A. As can be seen, the leading edge of a pulse occurs at the midpoint of each binary one bit cell, and between successive binary zero bit cells. Three frequency digital coding is well known in the art of magnetic recording and an example of a particular three frequency data encoder can be found in U.S. Pat. No. 3,697,977, entitled "Two Phase Encoder System for Three Frequency Modulation" issued to Sollman and Dixon on Oct. 10, 1972.

A clock signal waveform B in FIG. 2 defines the bit cell periods for the pulse encoded signal waveform A. The leading edges of the clock pulses occur at either a midpoint of a bit cell or between succesive bit cells. A clock pulse occurs simultaneously with any pulse occurring in the pulse encoded signal waveform A.

Referring now to FIG. 3, the shift register 10 comprises six serially connected D type edge triggered flip-flops labeled 50, 52, 54, 56, 58 and 60. Each flip-flop contains a set of inputs identifiable as C and D inputs and a set of outputs identifiable as Q and $\bar{Q}$ outputs. Each flip-flop operates so as to cause its Q output to follow the signal appearing at its D input upon the occurrence of a leading edge of a pulse applied to its C input. The signal at the $\bar{Q}$ output of each flip-flop merely reflects the negation of the signal at the respective Q output. In other words, the Q output follows the level of the D input upon the occurrence of the leading edge of a pulse applied to the C input, while the $\bar{Q}$ output merely reflects the negation of the Q output at any time.

The sequence of flip-flops 50 through 60 is reset by an initializing signal appearing on the line 14. The initializing signal remains logically high during the entire operation of the compensation system and enables and AND gate 62 which gates the clock signal through to the C inputs of each flip-flop.

The leading edge of a clock pulse when applied to each C input will trigger the respective flip-flop to thereby cause its Q output to follow the signal being applied to its D input. In the case of the flip-flop 50, the signal being applied to its D input is the pulse encoded signal appearing on the line 12. Hence, the flip-flop 50 will store the signal level of the pulse encoded signal each time the leading edge of a clock pulse occurs. The flip-flops 52 through 60 will store the signal levels of the immediately preceding flip-flop each time a clock pulse occurs so as to thereby serially shift the contents of each flip-flop to the right each time a clock pulse occurs.

The storing and shifting operations of the flip-flops will now be explained with reference to FIG. 2 wherein the Q output signals of each of the flip-flops 50 through 60 are separately illustrated as waveforms C through H respectively. At time $t_0$, all flip-flops are reset to zero by the initializing signal (not shown in FIG. 2). At time $t_1$ a clock pulse 64 occurs thereby causing the Q output of the flip-flop 50 to follow the low signal level of the pulse encoded signal waveform A. One-half of a bit cell period later, at a time $t_2$, a second clock pulse 66 occurs thereby causing the Q output of the flip-flop 50 to follow the logically high signal level of the pulse encoded signal waveform A. The flip-flop 50 thus stores the pulse $P_1$ of the pulse encoded signal waveform A as a stored pulse $SP_1$ as indicated by the waveform C. One-half of a bit cell period later, at a time $t_3$, a clock pulse 68 triggers the flip-flops thereby causing the stored pulse $SP_1$ to be shifted from the flip-flop 50 to the flip-flop 52 as is illustrated by the stored pulse $SP_1$ in the waveform D. The flip-flop 50 output waveform C goes low again in response to low signal level of the pulse encoded signal waveform A. However, at a time $t_4$, the flip-flop 50 stores a pulse $P_2$ from the pulse encoded signal waveform A as is indicated by the stored pulse $SP_2$ in the waveform C. At the same time $t_4$, the stored pulse $SP_1$ in the flip-flop 52 is shifted to the flip-flop 54 as is illustrated by the stored pulse $SP_1$ in the waveform E. Looking at the waveforms C through H, after time $t_4$, it is seen that each time a clock pulse occurs, the stored pulses $SP_1$ and $SP_2$ are shifted to the next succeeding flip-flop. In addition, pulses $P_3$, $P_4$, $P_5$ and $P_6$ are also first stored in the flip-flop 50 and subsequently shifted through the sequence of flip-flops. In this manner, the flip-flops 50 through 60 contain stored pulse representations of the most recently occurring sequence of pulses from the pulse encoded signal.

Referring to FIG. 1, it will be remembered that the contents of the shift register 10 are applied to a pattern decoder 18 which examines the pattern of stored pulse representations currently present in the shift register. The pattern decoder 18 is operative to generate either of three output signals on the lines 20–24, namely, an advance, a delay, or a no shift signal depending on the particular pattern present in the shift register 10.

FIG. 4 is a decision table for the pattern decoder 18 which illustrates the relationship between the input signals from the shift register 10 and the three output signals on the lines 20–24. The input signals to the pattern decoder 18 are listed from left to right and are alphabetically labeled so as to correspond with the labeled output signals from the flip-flops 50 through 60 of the shift register 10. The pattern decoder output signals "advance", "delay" and "no shift" are listed in the left column of the table. A row of input signal conditions appears to the right of each pattern decoder output signal. The input signal conditions are categorized as either being logically high as indicated by a binary 1 or logically low as indicated by a binary 0. It is to be initially noted that when neither of the input signal conditions are present to cause an advance or a delay signal then the no shift signal is automatically generated by the pattern decoder 18.

Figure 5:
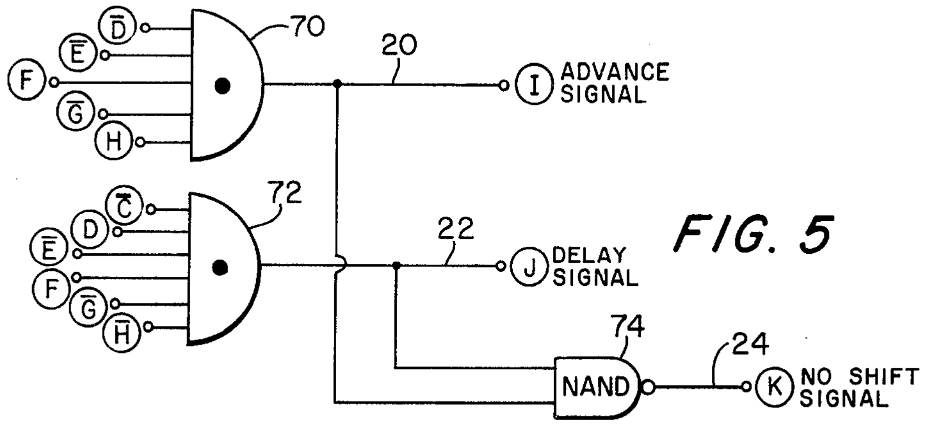

The advance, delay, and no shift signals of FIG. 4 are implemented by the gating of FIG. 5 which constitutes the pattern decoder 18. advance The advance signal is implemented by an AND gate 70 which receives the negation input signals $\overline{D}$, $\overline{E}$ and $\overline{G}$ as well as the assertion input signals F and H. The assertion input signals are the corresponding alphabetically labeled $\overline{Q}$ output signals of the flip-flops 50 through 60 whereas the negation input signals are the corresponding alphabetically labeled Q output signals of the flip-flops 50 through 60. When these various input signals are all logically high, the AND gate 70 will produce a logically high advance signal I on the line 20. The delay signal is implemented by an AND gate 72 in FIG. 5 which receives the negation input signals $\overline{C}$, $\overline{E}$, $\overline{G}$ and $\overline{H}$ as well as the assertion input signals D and F. When these various input signals are all logically high, the AND gate 72 will produce a logically high delay signal J on the line 22. The no shift signal is implemented by a NAND gate 74 which receives the output signals from both the AND gate 70 and the AND gate 72 and generates a logically high no shift signal K on the line 24 when neither an advance or a delay signal is logically high.

Referring now to FIG. 2, the advance, delay, and no shift signal waveforms I, J, and K resulting from the pulse encoded signal waveform A are illustrated. It is seen that the no shift signal waveform K is logically high during the first portion of FIG. 2. This is attributable to the stored pulses in the waveforms C through H not forming either pattern of input signal conditions present in FIG. 4. However, at time $t_5$, waveforms C, F, and H are all logically high whereas waveforms D, E, and G are all logically low. This pattern of input signal conditions to the pattern decoder 18 produces a logically high advance signal as is illustrated by the pulse 76 in the advance signal waveform I. The pulse 76 continues as long as the pattern of stored pulses in the waveforms C through H remains the same. However, when this pattern changes, the no shift signal waveform K again goes logically high indicating that the next occurring pattern of stored pulses does not produce either pattern of signal input conditions set form in FIG. 4. Continuing on until a time $t_6$, the waveforms D and F are logically high and the waveforms C, E, G, and H are logically low. This pattern of input signal conditions to the pattern decoder 18 produces a logically high delay signal as indicated by the pulse 78 in the delay signal waveform J. The pulse 78 remains for the duration of the pattern of stored pulses in the waveforms C through H, whereupon the no shift signal waveform K again goes high indicating the next occurring pattern of stored pulses does not produce either patterns of signal input conditions set forth in FIG. 4.

Figure 6:
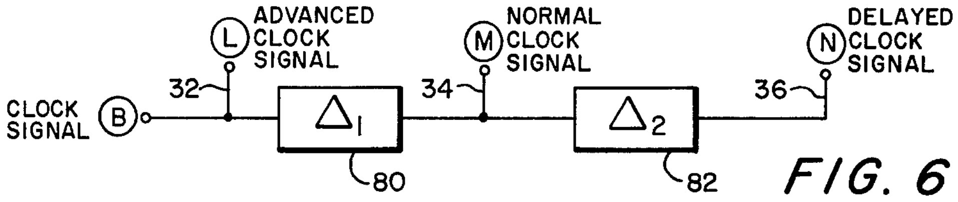

Turning now to the clock circuit 30 as it is illustrated in FIG. 6, the clock circuit generates three separate clock signals, namely an advanced clock, a normal clock and a delayed clock. These three clock signals are generated from three separate tap-off points positioned before, between and after a set of serially connected delays 80 and 82. The clock signals B which is applied to the clock circuit input terminal is tapped of as the advanced clock signal on the line 32. The clock signal B is then delayed an amount, $\Delta_1$ through the delay 80. The delay Δhd 1 is preset so as to equal the amount by which the pulse shift circuit 26 is to advance a pulse that is being applied to it. The once delayed clock signal is tapped off as the normal clock signal on the line 34. The once delayed clock signal is again delayed a second amount $\Delta_2$ through the delay 82. The delay $\Delta_2$ is preset so as to equal the amount by which the pulse shift circuit 26 is to be able to delay a pulse that is being applied to it. The twice delayed clock signal is tapped off onto the line 36 as the delay clock signal. The three clock signal waveforms from the clock circuit 30 are illustrated as waveforms L, M and N in FIG. 2. The delays $\Delta_1$ and $\Delta_2$ between the various clock signal waveforms are indicated. It should be noted that the values $\Delta_1$ and $\Delta_2$ are to be obtained for any particular recording system by first recording a pulse encoded signal and then measuring the amount of pulse shift present in the particular pulse patterns which are to be compensated for.

Figure 7:
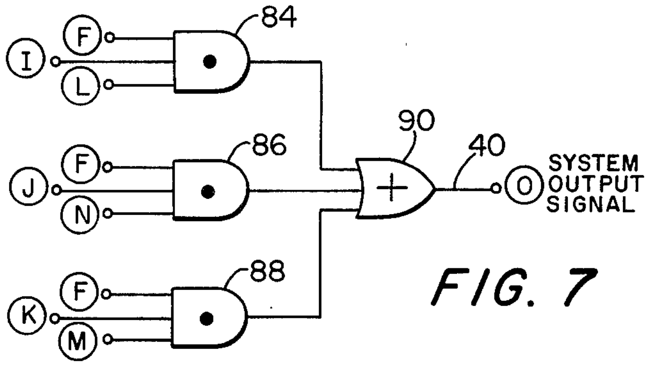
Figure 8:
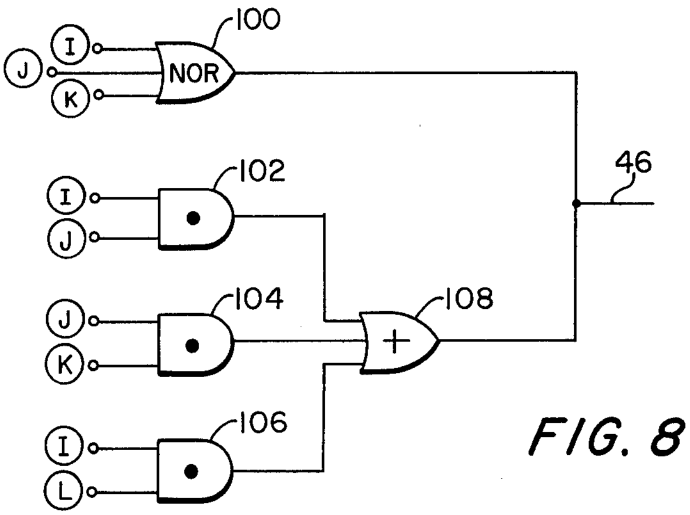

Turning now to the pulse shift circuit 26 as it is illustrated in FIG. 7. The pulse shift circuit in FIG. 7 comprises three AND gates 84, 86 and 88, each of which receives, as an input, the stored pulse signal present on the line 28. Referring to FIG. 3, it will be remembered that the line 28 is connected to the Q output of the flip-flop 56 so as to transmit the flip-flop 56 output signal F to the pulse shift circuit. Each of the AND gates 84, 86 and 88 accordingly receive as an input signal, the flip-flop output signal F. The AND gate 84 furthermore receives the advance signal, I, from the pattern decoder 18 as well as the advance clock signal L, from the clock circuit 30. The AND gate 86 receives the delay signal J from the pattern decoder as well as the delayed clock signal N, from the clock circuit. The AND gate 88 receives the no shift signal K from the pattern decoder 18 and the normal clock signal, M, from the clock circuit. The output signals from the AND gates 84, 86 and 88 are all applied to an OR gate 90 whose output is the line 40. The line 40 represents the output of the compensation system and transmits the system output signal O.

The operation of the pulse-shift circuit 26 is such as to cause the stored pulse signal present on the line 28 to be gated with one of the three respective clock signals depending on which shift is dictated by the pattern decoder 16. It will be remembered that only one of the pattern decoder signals, I, J or K will be logically high for any one pattern of stored pulses in the shift register 10. Referring to FIG. 2, the waveform K is logically high from time $t_0$ to time $t_4$. Therefore, the AND gate 88 will be enabled during this time period so as to gate any stored pulse in the flip-flop 56 output signal waveform F with a pulse in the normal clock signal waveform M. This occurs at a time $t_5$ when the stored pulse $SP_1$ in the waveform F is gated by the leading edge of a pulse 92 in the normal clock signal waveform M so as to produce a compensated pulse $CP_1$ in the system output signal waveform 0.

At time $t_6$, the pulse 76 in the advance signal waveform I is generated by the pattern decoder. This is due to the pattern of stored pulses present in the waveform C through H at time $t_6$. With the advance signal waveform signal waveform I high, the AND gate 84 is enabled so as to gate the stored pulse $SP_2$ in the waveform F simultaneously with a pulse 94 in the advanced clock signal waveform occurring at time $t_6$. This produces a compensated pulse $CP_2$ in the system output signal waveform 0.

At time $t_7$, the pulse 78 in the delay signal waveform J is generated by the pattern decoder. This is due to the pattern of stored pulses present in the waveforms C through H at time $t_7$. With the delay signal waveform J high, the AND gate 80 is enabled so as to gate the stored pulse $SP_4$ with a pulse 96 in the delayed clock signal waveform N occurring at a time $t_8$. This product the compensated pulse $CP_5$ in the system output signal waveform 0.

The compensated pulses present in the sytem output waveform 0 are thus seen to either be advanced or delayed or timed to occur simultaneously with the normal clock signal waveform M. The pulse-shift compensation associated with the compensated pulses $CP_2$ and $CP_4$ will result in these pulses eventually being retrieved in a form wherein they are no longer shifted relative to the non shifted compensated pulses $CP_1$ and $CP_2$. In other words, the shifting of these particular pulses will later be reshifted in the opposite direction by an amount attributable to the recording and retrieval error. This will result in the eventual retrieval of all pulses in the same sequentially spaced relationship which they were in when first encoded in the pulse encoded signal waveform A. When the pulses are so retrieved, the are easily decoded to their respective binary values.

Turning now to the fault detection circuit 44 which is illustrated in FIG. 7, it will be remembered that the fault detection circuit detects an erroneous signal condition in the signals I, J and K emanating from the pattern decoder 18. The pattern decoder signals I, J and K are first applied to a NOR gate 100 which generates a fault detection signal on the line 46 when these signals are all simultaneously low. A set of AND gates 102, 104, and 106 ANDs the various pattern decoder signals I, J and K together, so as to produce a signal at the output of an OR gate 108 when any two of the signals are simultaneously high. The output of the fault detection circuit 44 is connected to the line 46 which transmits any fault detection to the write driver 42.

The preferred embodiment of the invention has been limited to the particularly disclosed elements of the data compensaton system of FIG. 1. It should nonetheless be understood that it is within the scope of the invention to provide other alternative elemental structures. It should furthermore be understood that while the invention has been limited to a data compensation for three frequency coded data, other data codes which would result in the same pulse patterns and hence produce the same pulse shifting would also be compensatible by the present invention.

What is claimed is:

1. In a digital data recording system wherein digital data is pulse encoded in the three frequency digital code with the leading edge of a pulse occurring in the middle of a binary one bit cell and at the junction between successive binary zero bit cells so that pulses are spaced from each other in multiples of one-half bit cell increments, said pulse encoded data being in a form for subsequent recording on a magnetic medium and wherein certain patterns of encoded pulses produce pulse shifting when subsequently retrieved, a digital data compensation system which compensates for such pulse shifting prior to the recording of these pulses on the magnetic medium said compensation system comprising:

means for temporarily storing a sequence of encoded pulses in one-half bit cell increments so as to thereby form at any one time a pattern of stored pulses;

means for decoding the pattern of stored pulses so as to detect when either of two particular patterns of stored pulses is present in said temporary storage means; and means, responsive to said decoding means, for shifting a pulse within the particular pattern of stored pulses a defined amount so as to cancel out the pulse shift which would otherwise appear when the particular pattern is recorded and subsequently retrieved.

2. The compensation system of claim 1 wherein said pulse means shifting means comprises:

means, responsive to the detection of the first particular pattern of stored pulses, for advancing a pulse within the first particular pattern of stored pulses by a defined amount relative to the time in which it would otherwise occur; and means, responsive to the detection of the second particular pattern of stored pulses, for delaying a pulse within the second particular pattern of stored pulses by a defined amount relative to the time in which it would otherwise occur.

3. The compensation system of claim 2 further comprising:

means for generating and advanced clock signal, and a delayed clock signal; and wherein said means for advancing a pulse within the firt particular pattern comprises first means for gating the pulse to be advanced with the advanced clock signal; and said means, for delaying a pulse within the second particular pattern of stored pulses comprises second means for gating the pulse to be delayed with the delayed clock signal.

4. The compensation system of claim 1 wherein the first pattern of pulses consists of a first occurring pulse followed by a second occurring pulse spaced one full bit cell from the first occurring pulse and said second occurrring pulse is followed by the absence of another pulse for at least one and one-half bit cells, and wherein the second pattern of pulses comprises a first occurring pulse which has been immediately preceded by the absence of any pulse for one and one-half bit cells and which is followed by a second pulse which is spaced one full bit cell from the first occurring pulse.

5. The compensation system of claim 4 wherein said pulse shifting means comprises:

means, responsive to the detection of the first particular pattern of stored pulses, for advancing a pulse within the first particular pattern of stored pulses by a defined amount relative to the time in which it would otherwise occur; and means, responsive to the detection of the second particular pattern of stored pulses, for delaying a pulse within the second particular pattern of stored pulses by a defined amount relative to the time in which it would otherwise occur.

6. The compensation system of claim 5 further comprising:

means for generating an advanced clock signal, and a delayed clock signal; and wherein said means for advancing a pulse within the first particular pattern comprises first means for gating the pulse to be advanced with the advanced clock signal; and said means, for delaying a pulse within the second particular pattern of stored pulses comprises second means for gating the pulse to be delayed with the delayed clock signal.

7. The recording system of claim 6 further comprising:

a write drive circuit for recording the shifted pulses from said pulse shift means;

fault detection means for detecting an erroneous shift command signal from said decoding means, said detection means generating an error signal to said write driver circuit.

8. The recording system of claim 3 further comprising:

a write drive circuit for recording the shifted pulses from said pulse shift means;

fault detection means for detecting an erroneous shift command signal from said decoding means, said detection means generating an error signal to said write driver circuit.

9. The compensation system of claim 8 wherein said decoding, means generates three separate shift commands to said pulse shifting means, an advance shift command when the first particular pattern of pulses is detected, a delay shift command when the second particular pattern of pulses is detected, and no-shift command when any other pattern of pulses is detected, and said fault detection means comprises:

means for determining when the three separate shift commands are all logically low, and means for determining when two or more of the three separate shift commands are all logically high.

10. The compensation system of claim 7 wherein said decoding means generates three separate shift commands to said pulse shifting means, an advance shift command when the first particular pattern of pulses is detected, a delay shift command when the second particular pattern of pulses is detected, and a no-shift command when any other pattern of pulses is detected, and said fault detection means comprises:

means for determining when the three separate shift commands are all logically low, and means for determining when two or more of the three separate shift commands are all logically high.

11. A digital data compensation system which compensates for pulse shifting occurring in a pulse encoded signal comprising a series of bit cells wherein the leading edge of a pulse occurs at the middle of a binary one encoded bit cell and occurs at the junction between successive binary zero encoded bit cells, when the pulse encoded signal is recorded and subsequently retrieved from a magnetic medium said system comprising:

a plurality of at least six serially connected bilevel storage means for temporarily storing a plurality of equally segmented one-half bit cell portions of the pulse encoded signal, each bilevel storage means being operative to produce a bilevel signal indicative of the particularly stored segmented portion;

means for decoding the bilevel signals from said plurality of bilevel storage means, said decoding means comprising means for generating pulse shift command signals in response to the signal conditions of the bilevel signals from said plurality of bilevel storage means; and means for selectively shifting pulses from the pulse encoded signal in response to the pulse shift commands.

12. The digital data compensation system of claim 11 wherein said means for generating pulse shift command signals comprises:

means responsive to a first pattern of bilevel signals for generating an advance shift command, and means responsive to a second pattern of bilevel signals for generating a delay shift command.

13. The digital data compensation system of claim 12 wherein said plurality of at least six bilevel storage means comprises in numerically ascending order six edge triggered flip-flops each of which is triggered so as to store one-half of a bit cell of the pulse encoded signal at a time with the first, lowest ordered, edge triggered flip-flop storing the latest of the so stored one-half bit cell periods of the pulse encoded signal.

14. The digital data compensation system of claim 13 wherein the first pattern of bilevel signals is generated when the fourth and sixth edge triggered flip-flops are logically high and the second, third and fifth edge triggered flip-flops are logically low; and wherein the second pattern of bilevel signals is generated when the second and fourth edge triggered flip-flops are logically high and the first, third, fifth and sixth edge triggered flip-flops are logically low.

15. The digital data compensation system of claim 14 wherein the bilevel output signal of the fourth edge triggered flip-flop is applied to said means for selectively shifting pulses.

16. The digital data compensation system of claim 15 wherein said means for selectively shifting pulses comprises:

means for advancing the bilevel output signal from the fourth edge triggered flip-flop in response to an advance shift command; and means for delaying the bilevel output signal from the fourth edge triggered flip-flop in response to a delay shift command.

17. The recording system of claim 16 further comprising:

a write drive circuit for recording the shifted pulses from said pulse shift means; and fault detection means for detecting an erroneous shift command signal from said decoding means, said detection means generating an error signal to said write driver circuit.

* * * * *